(12) United States Patent
Dunn et al.

(10) Patent No.: US 9,877,429 B2
(45) Date of Patent: Jan. 30, 2018

(54) SWATHER TRACTOR WITH A COMPRESSOR ATTACHMENT

(71) Applicant: MacDon Industries Ltd., Winnipeg (CA)

(72) Inventors: James Thomas Dunn, Winnipeg (CA); Ryan Robert Georgison, Balmoral (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 15/193,748

(22) Filed: Jun. 27, 2016

(65) Prior Publication Data

US 2017/0071132 A1     Mar. 16, 2017

Related U.S. Application Data

(60) Provisional application No. 62/216,621, filed on Sep. 10, 2015.

(51) Int. Cl.
| | |
|---|---|
| *A01D 43/10* | (2006.01) |
| *A01D 34/835* | (2006.01) |
| *A01D 84/00* | (2006.01) |
| *A01D 84/02* | (2006.01) |
| *A01D 80/00* | (2006.01) |
| *A01D 69/03* | (2006.01) |
| *A01D 101/00* | (2006.01) |

(52) U.S. Cl.
CPC ......... *A01D 80/00* (2013.01); *A01D 34/8355* (2013.01); *A01D 43/10* (2013.01); *A01D 84/00* (2013.01); *A01D 84/02* (2013.01); *A01D 69/03* (2013.01); *A01D 2101/00* (2013.01)

(58) Field of Classification Search
USPC .......................................... 56/192
See application file for complete search history.

(56) References Cited

U.S. PATENT DOCUMENTS

| | | | | |
|---|---|---|---|---|
| 2,908,126 | A | * | 10/1959 | Dyrdahl ............... A01D 43/077 56/1 |
| 3,731,468 | A | * | 5/1973 | Blumhardt ............. A01D 57/30 56/16.4 B |
| 3,860,010 | A | * | 1/1975 | Anderson .......... A01D 41/1243 460/111 |

(Continued)

*Primary Examiner* — Alicia Torres
(74) *Attorney, Agent, or Firm* — Adrian D. Battison; Ade & Company Inc.; Michael R. Williams

(57) ABSTRACT

A swather includes a swath compression panel with a downwardly and rearwardly inclined undersurface for applying a downward compression force on the swath between the front and rear wheels. A mounting assembly includes an actuator operable in response to a speed and/or direction of travel of the tractor for raising the panel to a retracted position under the tractor. A bottom stop halts downward movement of the actuator before the panel engages the ground. The panel includes an upwardly and rearwardly inclined curved rear portion to smoothly release the compressed crop. The panel is mounted on the tractor frame at a position thereon rearward of a transverse beam connected to the front wheels so that the swath is released from the discharge opening of the header and can expand for discharge to the ground before the swath is engaged by the front end of the panel.

16 Claims, 6 Drawing Sheets

(56) References Cited

U.S. PATENT DOCUMENTS

| | | | | |
|---|---|---|---|---|
| 4,702,062 A | * | 10/1987 | Phelan | A01D 57/30 |
| | | | | 56/119 |
| 4,858,419 A | * | 8/1989 | Bernier | A01D 84/00 |
| | | | | 56/189 |
| 6,055,799 A | * | 5/2000 | Savoie | A01D 43/10 |
| | | | | 56/16.4 A |
| 7,975,606 B2 | * | 7/2011 | Fukayo | A01D 80/00 |
| | | | | 100/170 |

\* cited by examiner

SWATHER TRACTOR WITH A COMPRESSOR ATTACHMENT

This application claims the benefit under 35 USC 119 (e) of Provisional Application 62/216,621 filed Sep. 10, 2015.

This invention relates to a swath compressor attachment for mounting to a swather tractor for compressing the swath as it is formed behind the header of the tractor.

BACKGROUND OF THE INVENTION

In U.S. Pat. No. 7,159,687 (Dunn) issued Jan. 9, 2007 and assigned to the present Assignees is disclosed a hydrostatic agricultural tractor used as a self-propelled swather tractor. This uses the typical construction for such tractors which has front ground wheels mounted on the frame at fixed angles parallel to each other and parallel to a center line of the frame and rear ground wheels mounted on a respective castor. Each of the front ground wheels is driven by a respective drive motor which allows variable speed in both the first and second directions such that steering of the tractor is effected by a differential in speed between the front wheels with the rear wheels following the steering in a castoring action. The disclosure of this patent is hereby incorporated by reference or may be referred to for further detail not disclosed herein.

Such hydrostatically driven tractors used primarily for swathing are commonly used and readily available. The tractor carries at a forward end on suitable sprung supports a header for cutting standing crop with the crop being transported on the header to a suitable discharge location generally centrally of the tractor for forming a swath in the field from the cut crop.

Such tractors generally include a pair of front wheels just behind the header which are fixed to the frame of the tractor so that they remain at an angle parallel to each other and parallel to a center line of the tractor. The tractor is supported at the rear end by a pair of castor wheels which are attached to a cross axle pivotally connected to the frame at a center horizontal pivot point, commonly known as a walking beam. The axle is supported relative to the ground the castor wheels at the ends of the rear axle so that the wheels trail behind a vertical pivot mount for the wheels and are free to swivel through 360° around the pivot mount.

The front wheels only are driven and are driven in a manner which allows full control in the forward and reverse directions so that steering is effected by a differential speed between the two front wheels with the rear wheels following in the conventional castoring action.

Typically compression of the formed swath is required for fluffy crops which can blow away in windy conditions such as canola and flax and such compression is provided by swath rollers towed behind the swather tractor to apply pressure onto the swath as after it is discharged from the rear of the tractor.

An example is shown in Canadian Patent No: 599,761 issued Jun. 14, 1960 by Hellegards which shows a simple cylindrical roller attached behind a towed swather.

Many manufacturers have provided towed swath rollers which comprise a wheeled frame with a forwardly extending hitch pole which attaches to the rear of the swather tractor. One example is shown in a brochure by the present Applicants where a transverse beam carried on the ground wheels has a pair of rearwardly extending arms between which is mounted a metal roller drum. The drum has a cylindrical center section with flared frusto-conical ends. The height of the drum can be adjusted on the frame to adjust the pressure on the swath, depending on the thickness of the swath. The ends of the drum can be closed by circular end plates.

This type of swath roller has achieved considerable success and many have been sold by various manufacturers.

More recently the metal drum has been replaced by a plastic rotationally molded drum. This has advantage that it does not rust and can be manufactured cheaply but it has disadvantages that it slips on the crop and therefore may not properly rotate in a rolling action. Also the drum is very light so that it may not apply the required pressure.

Swather tractors have in recent years become much larger and more complex with some having independent suspension of the rear wheels. Such tractors are of the type with front wheels which are independently driven to provide a steering action together with castor rear wheels which follow the direction determined by the differential speeds of the front wheels. The towed swath rollers have become inadequate to provide a suitable convenient arrangement for the operator. At the same time there has been an increased demand for swath compression.

There are a number of problems with prior art rollers:

Poor visibility to rear of machine in field and on the road in cab forward mode as disclosed in Dunn above.

Poor visibility to front of machine on the road in engine forward mode.

Roller obscures the rear lights in the field.

Use of a roller with flared ends (different diameter from center section to outer sections), tends to be driven by the end sections which causes scrubbing at the center section since it has a slower peripheral speed. This can cause the crop to be disturbed with some of the heads flipped up out of the windrow and leave it vulnerable to wind and shattering.

The use of a forming device under the tractor will act to push into the windrow when the machine reverses.

A larger roller diameter is not practical due to poor visibility, weight etc.

SUMMARY OF THE INVENTION

It is one object of the invention to provide an improved swath compressor.

According to one aspect of the invention there is provided an agricultural tractor comprising:

a tractor frame having a cab;

a header mounted on support members at a forward end of the frame to be moved in a longitudinal working direction across the ground;

the header being arranged in a working position to cut a standing crop and to form a swath of the crop for deposit on the ground behind the tractor;

a first pair of front ground wheels mounted on the frame at positions spaced transversely of the frame adjacent the front end for supporting the tractor adjacent the header;

a second pair of rear ground wheels mounted on the frame at positions spaced transversely of the frame adjacent a rear end of the tractor and spaced to allow the passage of the swath between the second pair of wheels;

a swath compression member for applying a downward compression force on the swath;

a mounting assembly for attaching the swath compression member to the tractor for forward movement with the tractor;

the swath compression member comprising a panel member and the mounting assembly mounting a forward portion of the panel member on the swather for movement therewith and for pivotal movement relative thereto about a substantially horizontal axis transverse to the direction of movement of the swather, the panel member having a downwardly and rearwardly inclined undersurface thereof arranged to engage the swath formed by the swather as it lies on the stubble, the panel member being biased downwardly by the mounting assembly into contact with the swath to compress the swath into the stubble.

In accordance with a first important aspect of the invention in a first improvement the mounting assembly includes an actuator operable in response to a signal indicative of a speed of the tractor for raising the panel member from the swath to a retracted position. Preferably the actuator is operable to raise the panel member in response to a reduction in forward speed of the tractor including a reduction up to a stopping of the forward speed of the tractor. In this way the panel member is raised in the event that a slowing of the forward speed indicates that the harvesting action is being halted. Also, the action of raising the panel member at the stopping of the tractor ensures that the panel member is raised when the tractor is driven in reverse, thus ensuring that the laid swath is not disturbed and the panel member is not damaged by intentional engagement with the ground or other object. Preferably the actuator includes a hydraulic cylinder. This may be simply a double acting cylinder which has one end connected to the panel member and the other end to the tractor. The cylinder may have some spring action to allow compression of the cylinder in the event that upward pressure is applied to the panel member from excess crop or from an object in the field. In other arrangements the cylinder may act on a spring or may include a spring so as to move the spring between the retracted and extended positions.

Preferably there is provided a bottom stop to halt downward movement of the actuator before the panel member engages the ground. That is there is no engagement of the panel member with the ground and the panel is set at a position spaced from the ground but arrangement to provide the required compression to the swath. The system may also use a height sensor that senses the position of the panel member. With this sensor, the panel member can be repeatedly positioned at a known height above the ground by stopping the cylinder at the correct extension/retraction. That is the panel member is supported on the swath and has no portion thereof engaging the ground.

Preferably the panel member is located underneath the tractor rearwardly of the front wheels and forwardly of the rear wheels.

In accordance with another further improvement independent of the first, the panel member has in transverse cross-section a substantially flat central band and at least two downwardly depending side deflector panels.

In accordance with another further improvement independent of the first, the panel member includes an upwardly and rearwardly inclined rear portion at a rear end of the undersurface. Preferably the rear portion connects to the undersurface in a smoothly curved section for smoothly releasing the swath from the rear of the undersurface. This curvature simulates the curvature of a conventional roller so that the crop is compressed and then smoothly released as it flows underneath the upwardly curved tail of the panel member. Preferably the smoothly curved section has a radius of curvature greater than 1 foot and typically of the order of 3 feet.

In accordance with another further improvement independent of the first, the panel member is mounted on the tractor frame at a position thereon rearward of a transverse beam connected to the front wheels so that the swath is released from the header and can expand for discharge to the ground before the swath is engaged by the panel member. The swath may be engaged by a portion of the panel member rearward of the front edge depending on the height of the swath from the ground before compression. Typically the front end of the panel member is at least 4 feet rearward of the discharge location on the header.

Preferably the panel member is formed of a stationary sheet of a material which allows the crop in the swath to slide over the surface. A suitable material is polyethylene. However other materials can be used which provide sufficiently low friction for the crop to flow over the inclined panel without bunching.

In accordance with another further improvement independent of the first, the panel member may include a center draper member movable longitudinally of the panel member.

The arrangement as described hereinafter may provide one or more of the following advantage:

Eliminates issues listed above.

The shape of windrow can be controlled by adjusting the side deflectors.

Device raises when the tractor reverses after stopping or the forward speed is reduced below a set value.

The diameter of the curved intersection between the surface of the panel and the tail where crop is released can be very large to gently release the crop. This prevents the crop from springing up too quickly causing shelling.

The movable surface of the center draper (if implemented) can be adjusted to closely match ground speed so that the crop is gently compressed into the stubble. That is the conveyor or draper speed can be linked to ground speed. Actual ground speed or some indexed value above or below ground speed. The indexed value could be a percentage of the ground speed or a fixed value. Ex. If ground speed is 10 mph, conveyor speed could be indexed at 10% over ground speed giving conveyor speed of 11 mph or it could be indexed at a fixed value of say, 0.5 mph over ground speed giving conveyor speed of 10.5 mph. Index value may be controlled from inside cab or be set values.

When ground speed is below a certain (variable or set) speed or in reverse, the deck raises up and conveyor shuts off. The deck lowers and starts the conveyor again when forward ground speed is above the set speed.

The conveyor shuts off (or turns very slowly) when the deck is raised. The conveyor can also be driven in reverse when machine backs up.

The panel member can be used with or without crop deflecting surfaces outside at the sides of the center main sheet or of the draper if used where the side deflector panels act to push the edges of the windrow down to prevent the wind from catching the crop.

An extra swath compressing force beyond the weight of the panel member can be applied using springs, gas shocks or hydraulic cylinder(s). There may be additional components or may use lifting hydraulic cylinder to apply force.

The deflector curves upward where the crop is release to provide a gentle release of the crop and reduce shelling of the crop.

A pressure reducing relieving valve can be provided to the cylinder so that the downward force (spring action) on the compression member or panel can be adjusted depending on crop requirements under control of an input from the tractor operator.

As set forth herein, the compression member or panel can be raised at some point at the end of the field before a turn, using various options for detecting when the harvesting operation is halted including operator input. For example, the compression member can automatically raise when the header is shut off.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
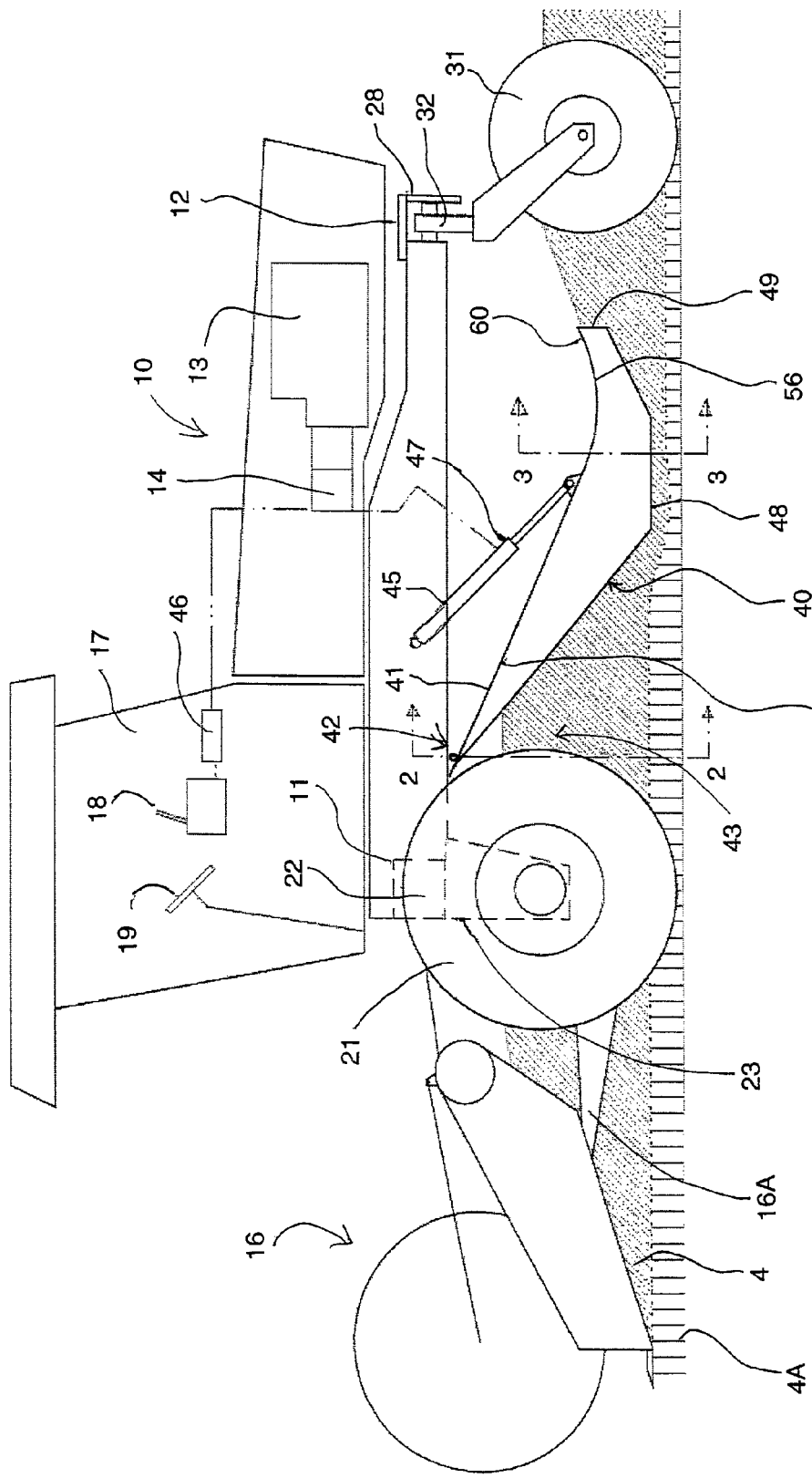
FIG. 1 is a longitudinal cross sectional view of a swather tractor having a swath compressor attachment according to the present invention.

In FIG. 1 is shown a swather tractor of the above type which includes a frame 10 with a front axle 11 and a rear axle 12. On the frame 10 is mounted a motor 13 driving a gear box and pump assembly schematically indicated at 14 for communicating hydraulic drive fluid to the various components of the tractor for propelling the tractor and for driving a header 16 mounted on the tractor. The header 16 for cutting a standing crop is carried on support arms 16A mounted on the tractor at the forward end in conventional manner which provide a floating and lifting action for the header. The tractor includes a cab 17 including steering 19 and control elements 18 operable by the driver with those control elements and steering acting to communicate control movements to a fluid control system which supplies the fluid to the various elements to be driven.

The tractor includes first wheels 21 and 22 mounted on legs 23 extending downwardly from the front axle 11. Each leg carries a drive motor for providing drive power to the respective wheel 21, 22 in response to the supply of hydraulic fluid from a control system. The wheels 21 and 22 are mounted on hubs attached to the motors so that the wheels are supported at a fixed angle to the frame so as to be parallel to each other and parallel to a center line of the tractor. Thus the tractor is not steered by pivotal movements of the wheels which are fixed.

The rear axle 12 is preferably mounted for pivotal movement on a center pivot defining a horizontal axis longitudinal of the center line of the tractor so as to form what is commonly known as a walking beam. However the rear axle may be fixed and all vertical movement is provided by the suspension members at each end. At the outer end 28 of the axle 12 is mounted a respective castor wheel 31 which can swivel around a vertical pivot member 32 of the castor. Thus the wheels on the axle 12 are castor wheels which are again not steered but free to rotate around the vertical axis defined by the pivot 32. The wheels can also include independent suspensions systems of the type shown in U.S. Pat. No. 8,020,648 (Otto) issued Sep. 20, 2011 to the present assignees.

Tractors of this type are well known and are highly maneuverable since the steering is effected by differential speed or differential rotation of the wheels 21 and 22 with the castor wheels 31 merely following the steering action as required. It is well known that such tractors are generally used with the driven wheels 21 and 22 forward so that the implement is in front of those wheels.

In the present invention there is provided a swath compression device 40 for compressing the swath 4 formed by the header and fed between the front wheels 21.

Figure 6:
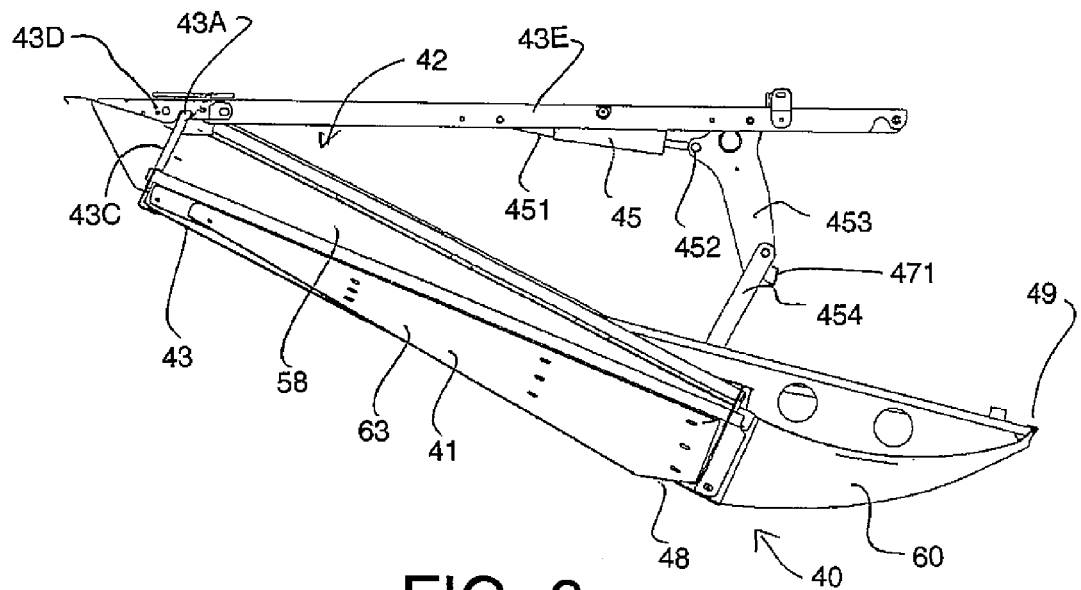
FIG. 6 is a side elevational view of the attachment alone of the tractor of FIG. 1.

The swath compression device 40 comprises a panel member 41 and a mounting assembly generally indicated at 42 which mounts a forward portion 43 of the panel member on the swather tractor for forward movement of the panel member with the tractor over the ground. The panel member engages the top surface of the swath 4 so as to act to compress the swath onto the ground and onto stubble 4A standing on the ground. The mounting assembly 42 also allows pivotal movement of the panel 41 about a transverse axis 43A defined by a hinge or other mounting assembly on the tractor. The pivotal movement can be about a single axis or can include some movement of the axis forwardly and rearwardly such as by a compound linkage. Thus as shown in FIG. 6, the front end 43 of the panel is carried on a link 43C or support which extends upwardly to a pivot point 43D on a frame 43E attached on the underside of the frame of the tractor. While it is preferred to provide a separate frame for attachment to the tractor and to attach the panel to this frame, it is also possible that the front pivot coupling of the panel is directly attached to the header so that it is part of the header construction rather than the tractor. A linkage may be provided which allows the panel to be carried at a position spaced rearwardly of the discharge of the header as described herein.

The panel member 41 provides a downwardly and rearwardly inclined undersurface 44 which engages the swath 4 formed by the swather as the swath lies on the ground and in the stubble 4A. The panel member is biased downwardly into compression on the top of the swath either by gravity or as shown by a cylinder or other compression member 45 connected between the panel member and the tractor so as to provide an additional force. The amount of force provided is selected to ensure that the compression panel member applies a sufficient force to the swath to reduce its volume to a required amount by pushing the surface of the swath downwardly and thus causing the material of the swath 4 to enter the stubble 4A.

The actuator mechanism 45 as shown in FIG. 6 comprises a cylinder with one end 451 connected to the frame 43E and a second end 452 connected to a linkage having two pivotal links 453 and 454 forming a knee joint so that retraction of the cylinder drives the panel 41 downwardly and extension of the cylinder pushes the panel 41 up to the frame 43E.

The cylinder 45 thus applies downward pressure to the panel member 41 and can also provide lifting force to move the panel member from the deployed downward position shown in FIG. 1 to an upwardly retracted position where the panel is moved upwardly to a position closely adjacent the frame of the tractor where the panel member 41 is lifted away from the swath to a situation where it does not interfere with the swath as the tractor moves across the swath.

The lifting mechanism 45 can be the same mechanism which applies the downward force but also these functions can be carried out by separate components or by linked components.

The position of the panel member 41 is operated by a control device 46 mounted preferably in the cab 17 where the control device receives an input from the speed control 19 allowing the control unit 46 to operate the actuator 45 in the event that the speed of the tractor is reduced relative to a set operating speed. Thus in the event that the control device 46 receives a signal from the speed control 19 indicating that the operator has reduced the speed of the tractor from the normal operating speed, the actuator 45 is operated automatically to raise the panel member upwardly to the retracted position. In this way immediately the tractor is slowed from the operating speed the panel member is retracted. Thus the panel member is retracted when the tractor is halted and also when the tractor is moved into a reverse operation. The actuator 45 is maintained in the retracted position at all times after the speed is reduced and is only moved back to the operating position when a signal is provided indicating that the tractor is returned to the forward direction and to the operating speed. A manual control of the panel height may also be provided so that the operator can manually control the position of the panel.

As illustrated the actuator 45 is a hydraulic cylinder but it will be appreciated that other mechanisms can be used for this operation including compound linkage arrangements where the actuator drives a compression device such as a spring to an over centre position in which the spring biases the panel member to the raised position. Many different such compound linkages can be designed to fulfill these functions.

The actuator 45 can include a bottom stop 47 on the cylinder or 471 on the linkage which causes the height of the panel member to be halted at a position in which the panel member is spaced from the ground so that the lowest point 48 of the panel member is spaced from the ground and the panel member sits on the swath at a height determined by the actuator 45 and the stop 47. Other types of stop mechanism can be used in other compound linkages which control the movement of the panel member between the retracted and operating positions.

One other feature that can be used is to have the panel 41 only lower if the header drive is engaged (along with the other requirement that the machine must be traveling forward at a minimum speed). This would prevent the panel from being lowered if the operator is traveling in the field or on the road without actually cutting, travelling along the end of a field for instance.

Figure 4:
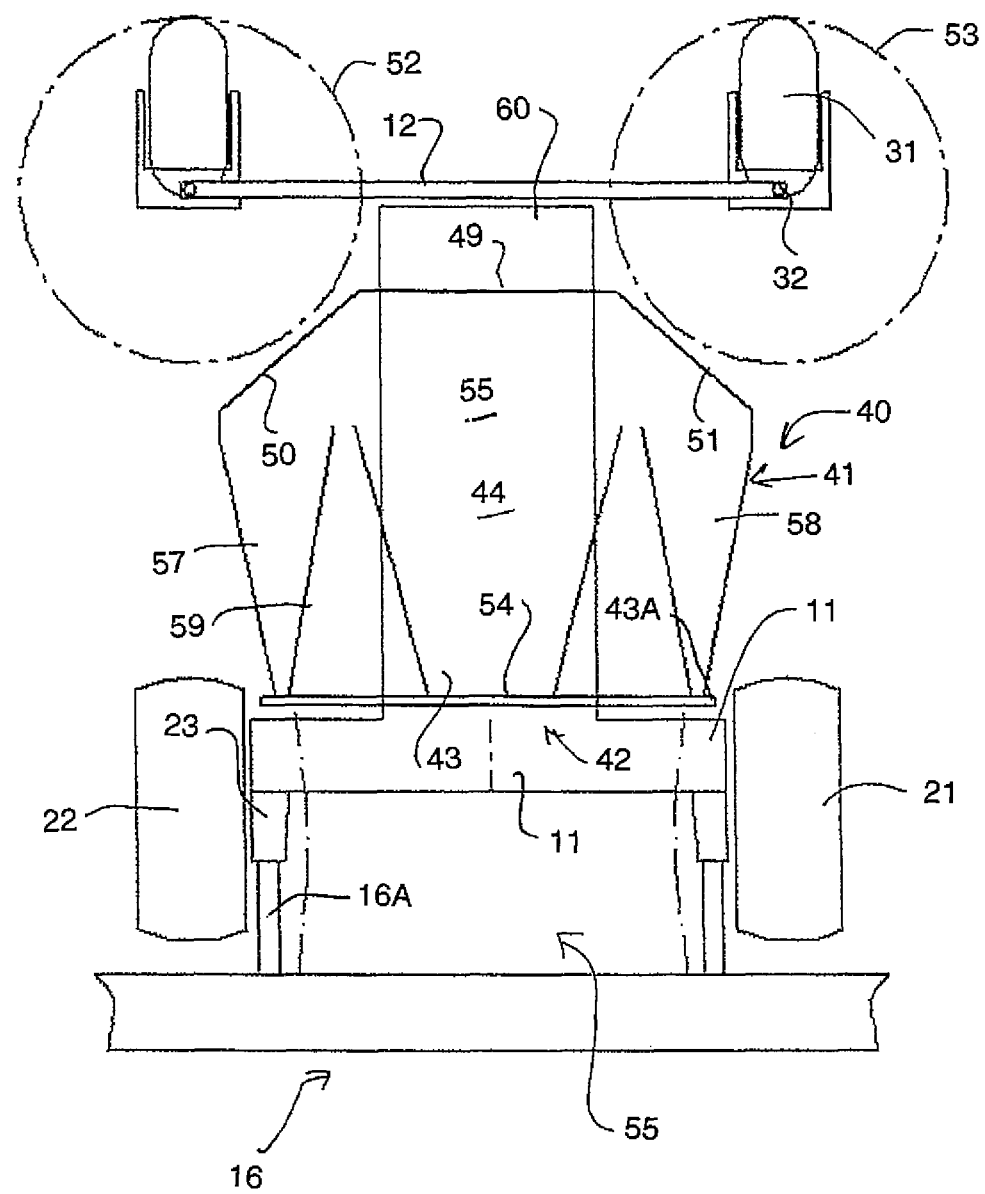
FIG. 4 is a top plan view shown schematically of the tractor of FIG. 1.
Figure 5:
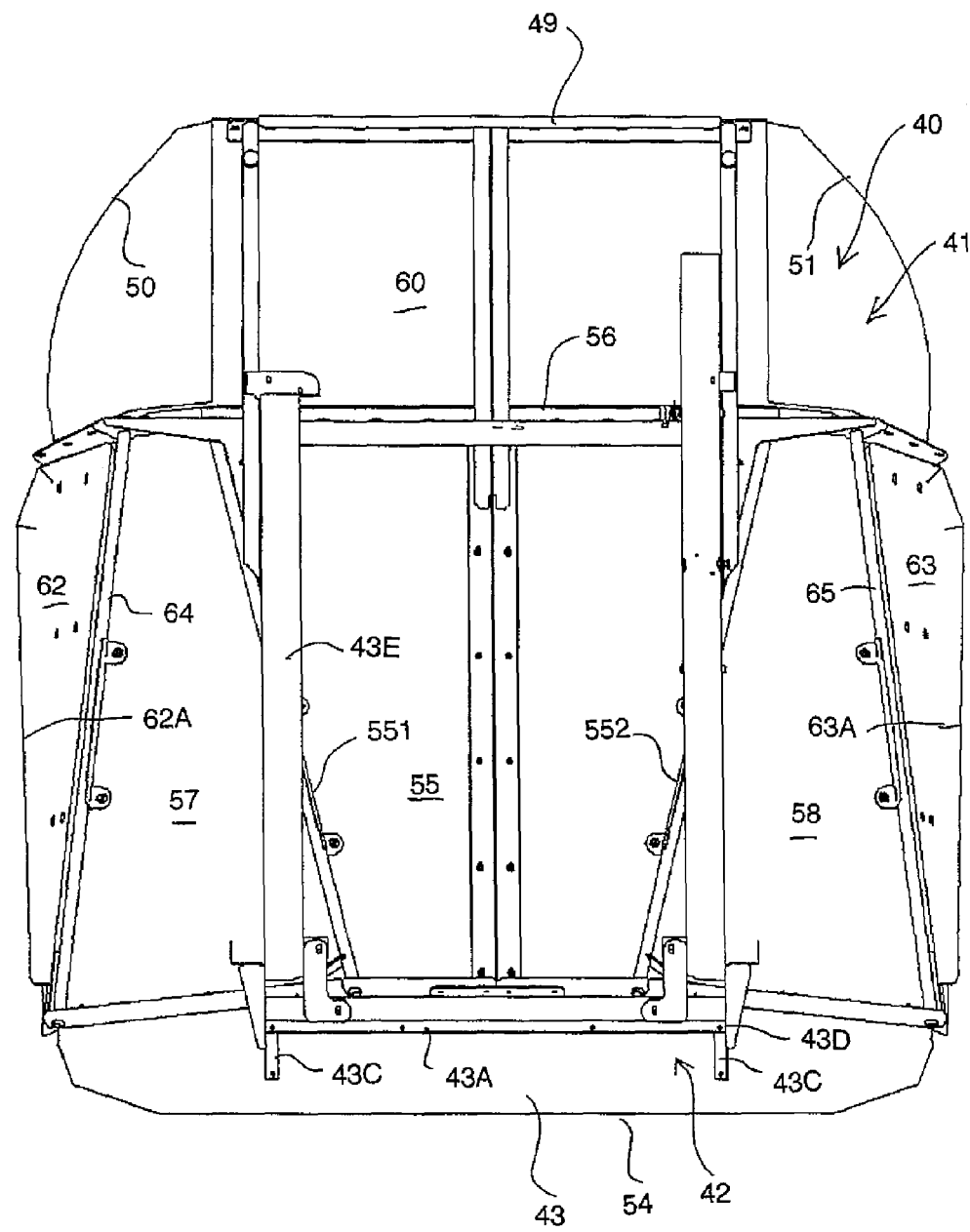
FIG. 5 is a top plan view of the attachment alone of the tractor of FIG. 1.

As shown in FIG. 4, the panel member 41 is mounted with the front pivot axis 43A located at a position rearward of the front axle 11. This acts to locate the panel member 41 at a position rearward of the front wheels 21 and forward of the rear wheels 31. Thus the panel member is located under the tractor and is not behind the tractor where it can interfere with visibility by the driver of the swath behind the tractor. Also the panel member is protected underneath the tractor and is not trailed behind in a manner which could cause it to swing to the side to cause damage to adjacent objects or to the panel member itself.

The panel member 41 is located therefore substantially wholly behind the front wheels 21 and wholly in front of the rear wheels 31. The position of a rear edge 49 of the panel member is such that the forwardly and outwardly inclined side edges 50 and 51 of the panel member are located outside imaginary circles 52 and 53 indicating the extreme positions of rotation of the caster wheels 31 around their support 32. In this way it will be appreciated that the wheel 31 can rotate to position in which the vehicle is moving in the rearward direction without at any time the wheel being able to contact or interfere with the panel member.

A front edge 54 of the panel member at the axis 43A is positioned rearward of the front axle 11. This position therefore is rearward of an opening 55 of the header 16 at which the swath is formed. It will be appreciated that the header includes a converging system which carries the current crop from a cutter bar inwardly to the opening 55 where the crop material is discharged to the ground. As it is discharged it remains in a raised fluffy condition and the swath must fall from that raised position downwardly to the ground in a free unfettered flow so that the swath is properly formed without interference, before it is pushed downwardly to the ground in the compression action. This typically requires the front edge of the panel member to be spaced by a distance of the order of at least 4 feet behind the opening 55 so that the swath is first engaged with the surface 44 at a position behind where it is already properly deposited on the ground.

The length of the panel member is arranged as long as possible between the front edge 54 and the rear edge 49 as defined by the above requirements. This provides as shallow an angle of downward decline of the panel member as possible so that the downward force on the swath is insufficient to push the swath forwardly in a bunching action as the panel moves forwardly with the tractor. The angle of the surface is therefore preferably less than 30 degrees.

The panel member 41 is shaped to include a central band 55 which extends from the front edge 54 rearwardly to a transverse edge 56 where the band 55 is generally flat or of a shallow arch. On each side 551, 552 of the band 55 is an inclined depending sidewall 57, 58 which extends downwardly and outwardly from the centre band 55 at a relative to a generally flat plane of the centre band 55 from an upper edge 59 to the bottom edge 48. This sidewall thus forms a deflector plate which engages the sides of the swath to push those edges downwardly more vigorously to the ground so that the side edges of the swath when formed are closer to the ground to prevent wind from lifting those edges. The side panels 57 and 58 may be mounted for pivotal adjustment at the connection 551, 552 to the centre band 55 so as to adjust the side pressure on the side edges of the swath. However the panels are fixed in operation so as to apply a common load to the swath.

Figure 2:
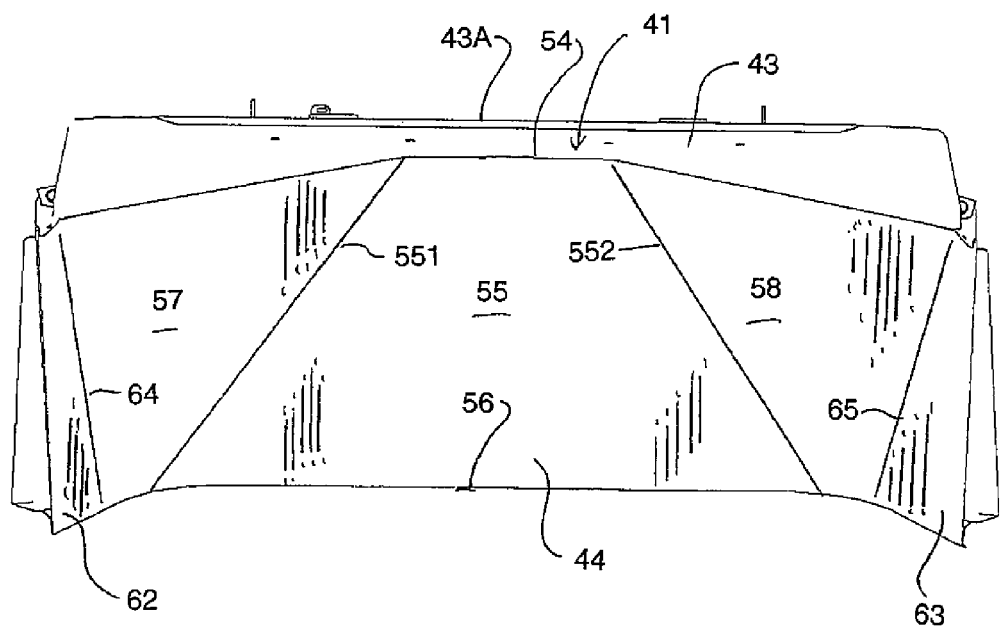
FIG. 2 is a view taken along the lines 2-2 of the tractor of FIG. 1 showing only the compression device.
Figure 3:
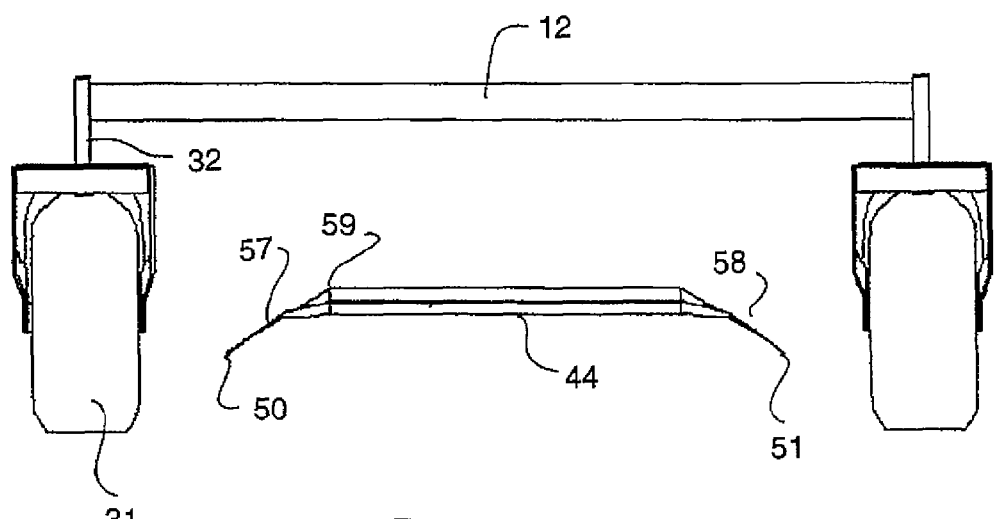
FIG. 3 is a view taken along the lines 3-3 of the tractor of FIG. 1.

In addition to the downwardly and outwardly extending panels 57 and 58, final outer panels 62 and 63 are located at outer edge 64 and 65 of the panels 57 and 58. These outermost panels 62 and 63 are turned downwardly at a greater angle than the panels 57 and 58. As shown best in FIGS. 2 and 3, the panel 55 diverges outwardly so that the space between the sides 551 and 552 at the rear is greater than at the front. The panels 57 and 58 converge toward the rear and the panels 62 and 63 are triangular so that their outermost edge 62A and 63A are generally parallel and at right angles to the front edge 54.

Figure 7:
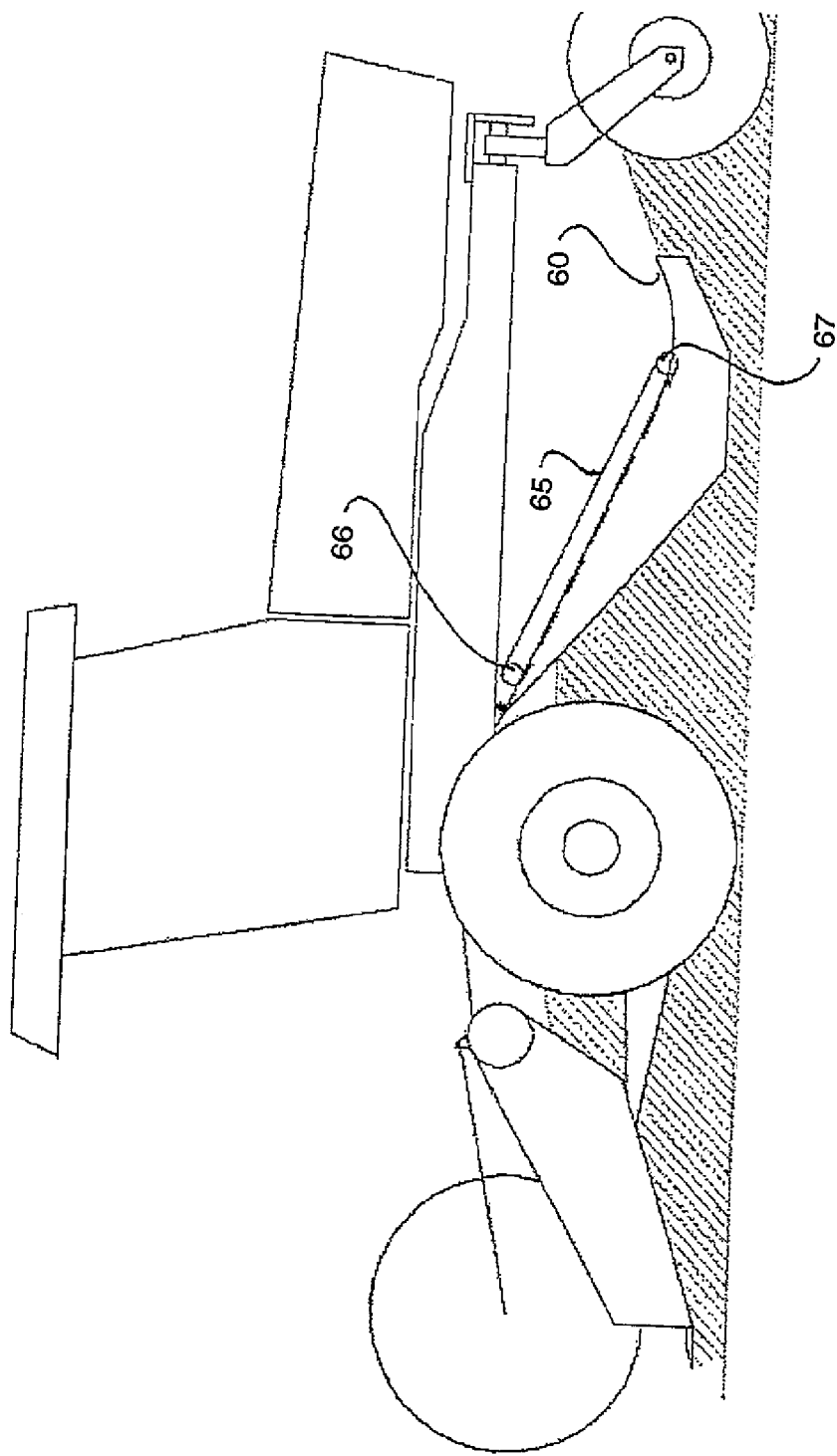
FIG. 7 is a cross-sectional view similar to that of FIG. 1 showing a modified arrangement including a draper sheet for engaging the crop on the underside of the compression device.

Thus the centre band 55 extends downwardly and rearwardly to the bottom edge 56 at which it curves upwardly and rearwardly into a tail portion 60. The connection between the centre band 55 and tail portion 60 is arranged to define a curved section for smoothly releasing the swath as it moves downwardly and rearwardly over the panel 41 allowing the compression on the swath to be gradually released as the tail portion 60 moves over the swath. The radius of curvature between the rear edge 56 of the panel 55 and the front edge of the tail portion 60 is such that it defined a radius of curvature greater than 1 foot and typically of the order of 3 feet. The rearmost edge 49 of the tail portion 60 is thus raised above the bottom edge 48 and located at a position where the crop is released without significant pressure at the edge 49. This smooth flow and release prevents what would otherwise be a sharp transverse edge from pulling forward on the crop in the swath laid into the stubble As shown in FIG. 7 is a modified arrangement in which the centre panel 55 is replaced by a centre conveyor or draper 65 mounted on rollers 66 and 67 so that in effect the surface of the panel member is movable in a rearward direction at the panel moves forwardly over the crop. In this way there is no forward force on the top part of the swath by frictional engagement with stationary surface since the surface is moving rearwardly. The speed of movement can be controlled to match the forwarding speed of the tractor so that the surface is effectively stationary relative to the swath or can be slightly faster or slower than the forwarding speed. The conveyor belt 65 can be driven in reverse direction when the tractor is moving in reverse so as to ensure that any contact with the swath in the retracted position of the panel member does not cause any forwarding movement of any part of the swath which may contact the surface.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swather comprising:
   a tractor frame having a cab;
   a header mounted on support members at a forward end of the frame to be moved in a longitudinal working direction across the ground;
   the header being arranged in a working position to cut a standing crop and to form a swath of the crop for deposit on the ground behind the tractor;
   a first pair of front ground wheels mounted on the frame at positions spaced transversely of the frame adjacent the front end for supporting the tractor adjacent the header;
   a second pair of rear ground wheels mounted on the frame at positions spaced transversely of the frame adjacent a rear end of the tractor and spaced to allow the passage of the swath between the second pair of wheels;
   a swath compression member for applying a downward compression force on the swath;
   a mounting assembly for attaching the swath compression member to the tractor for forward movement with the tractor;
   the swath compression member comprising a panel member and the mounting assembly mounting a forward portion of the panel member on the swather for movement therewith and for pivotal movement relative thereto about a substantially horizontal axis transverse to the direction of movement of the swather, the panel member having a downwardly and rearwardly inclined undersurface thereof arranged to engage the swath formed by the swather as it lies on the stubble, the panel member being biased downwardly by the mounting assembly into contact with the swath to compress the swath into the stubble;
   wherein the mounting assembly includes an actuator operable in response to a signal indicative of a speed and/or direction of travel of the tractor for raising the panel member from the swath to a retracted position.

2. The swather according to claim 1 wherein the actuator is operable to raise the panel member in response to a reduction in forward speed of the tractor.

3. The swather according to claim 1 wherein the actuator is operable in response to a stopping of the forward speed of the tractor.

4. The swather according to claim 1 wherein the actuator includes a hydraulic cylinder.

5. The swather according to claim 1 wherein there is provided a bottom stop to halt downward movement of the actuator before the panel member engages the ground.

6. The swather according to claim 1 wherein the panel member is located underneath the tractor rearwardly of the front wheels and forwardly of the rear wheels.

7. The swather according to claim 1 wherein the panel member has in transverse cross-section a substantially flat central band and two downwardly depending sides.

8. The swather according to claim 1 wherein the panel member has a central band and two downwardly depending sides, wherein the panel member includes at least at the central band an upwardly and rearwardly inclined rear portion at a rear end of the undersurface of the central band and wherein the rear portion at the central band connects to the undersurface in a smoothly curved section for smoothly releasing the swath from the rear of the undersurface of the central band.

9. The swather according to claim 1 wherein the panel member is mounted on the tractor frame at a position thereon rearward of a transverse beam connected to the front wheels and at least 4 feet rearward of the discharge location on the header so that the swath is released from the header and can expand for discharge to the ground before the swath is engaged by the front end of the panel member.

10. The swather according to claim 1 wherein the panel member includes a center draper member movable longitudinally of the panel member.

11. The swather according to claim 1 wherein the panel member is moved to the lowered position only if the header drive is engaged and the tractor is traveling forward at a minimum speed.

12. The swather according to claim 1 wherein the panel member is positioned at a required height spaced from the ground using height sensor and electronic control.

13. A swather comprising:
    a tractor frame having a cab;
    a header mounted on support members at a forward end of the frame to be moved in a longitudinal working direction across the ground;
    the header being arranged in a working position to cut a standing crop and to form a swath of the crop for deposit on the ground behind the tractor;
    a first pair of front ground wheels mounted on the frame at positions spaced transversely of the frame adjacent the front end for supporting the tractor adjacent the header;
    a second pair of rear ground wheels mounted on the frame at positions spaced transversely of the frame adjacent a rear end of the tractor and spaced to allow the passage of the swath between the second pair of wheels;
    a swath compression member for applying a downward compression force on the swath;

a mounting assembly for attaching the swath compression member to the tractor for forward movement with the tractor;

the swath compression member comprising a panel member and the mounting assembly mounting a forward portion of the panel member on the swather for movement therewith and for pivotal movement relative thereto about a substantially horizontal axis transverse to the direction of movement of the swather, the panel member having a downwardly and rearwardly inclined undersurface thereof arranged to engage the swath formed by the swather as it lies on the stubble, the panel member being biased downwardly by the mounting assembly into contact with the swath to compress the swath into the stubble;

wherein the panel member has a central band and two downwardly depending sides;

wherein the panel member at least at the central band includes an upwardly and rearwardly inclined rear portion at a rear end of the undersurface of the central band;

and wherein the rear portion at the central band connects to the undersurface in a smoothly curved section for smoothly releasing the swath from the rear of the undersurface of the central band.

14. The swather according to claim 13 wherein the panel member is mounted on the tractor frame at a position thereon rearward of a transverse beam connected to the front wheels and at least 4 feet rearward of the discharge location on the header so that the swath is released from the header and can expand for discharge to the ground before the swath is engaged by the front end of the panel member.

15. A swather comprising:

a tractor frame having a cab;

a header mounted on support members at a forward end of the frame to be moved in a longitudinal working direction across the ground;

the header being arranged in a working position to cut a standing crop and to form a swath of the crop for deposit on the ground behind the tractor;

a first pair of front ground wheels mounted on the frame at positions spaced transversely of the frame adjacent the front end for supporting the tractor adjacent the header;

a second pair of rear ground wheels mounted on the frame at positions spaced transversely of the frame adjacent a rear end of the tractor and spaced to allow the passage of the swath between the second pair of wheels;

a swath compression member for applying a downward compression force on the swath;

a mounting assembly for attaching the swath compression member to the tractor for forward movement with the tractor;

the swath compression member comprising a panel member and the mounting assembly mounting a forward portion of the panel member on the swather for movement therewith and for pivotal movement relative thereto about a substantially horizontal axis transverse to the direction of movement of the swather, the panel member having a downwardly and rearwardly inclined undersurface thereof arranged to engage the swath formed by the swather as it lies on the stubble, the panel member being biased downwardly by the mounting assembly into contact with the swath to compress the swath into the stubble;

wherein the panel member includes a center draper member movable longitudinally of the panel member.

16. The swather according to claim 15 wherein the panel member is mounted on the tractor frame at a position thereon rearward of a transverse beam connected to the front wheels and at least 4 feet rearward of the discharge location on the header so that the swath is released from the header and can expand for discharge to the ground before the swath is engaged by the front end of the panel member.

* * * * *